United States Patent
Deshmukh et al.

(10) Patent No.: US 11,970,813 B2
(45) Date of Patent: Apr. 30, 2024

(54) MATING INTERFACE ASSEMBLY BETWEEN A DISPENSER HOSE AND WASH UNIT TUB OF A WASHER AND DRYER COMBINATION APPLIANCE

(71) Applicant: Whirlpool Corporation, Benton Harbor, MI (US)

(72) Inventors: Rajwardhan Deshmukh, Maharashtra (IN); Mohsin M. Attar, Maharashtra (IN); Arun Rajendran, St. Joseph, MI (US); Kurt L. Masciovecchio, St. Joseph, MI (US); Jason R. Spears, St. Joseph, MI (US); Michael Vriezema, St. Joseph, MI (US); Kristian N. Engelsen, South Bend, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 140 days.

(21) Appl. No.: 17/553,557

(22) Filed: Dec. 16, 2021

(65) Prior Publication Data
US 2023/0193549 A1    Jun. 22, 2023

(51) Int. Cl.
*D06F 39/08* (2006.01)
*D06F 25/00* (2006.01)
(Continued)

(52) U.S. Cl.
CPC ............ *D06F 39/088* (2013.01); *D06F 25/00* (2013.01); *D06F 37/267* (2013.01); *F16L 37/0982* (2013.01); *F16L 37/244* (2013.01)

(58) Field of Classification Search
None
See application file for complete search history.

(56) References Cited

U.S. PATENT DOCUMENTS

| 2008/0072632 | A1 | 3/2008 | Je et al. | |
| 2011/0232335 | A1* | 9/2011 | Johnson | F16L 41/086 68/19 |
| 2012/0210753 | A1* | 8/2012 | Chung | D06F 39/081 68/17 R |

FOREIGN PATENT DOCUMENTS

| CN | 112391806 A | 2/2021 |
| DE | 102016200604 B3 | 2/2017 |

(Continued)

OTHER PUBLICATIONS

FR 2635368 translation, Fixing And Sealing System For Connecting Flexible Component In Washing Has Flexible Tube Gripped Between Two Conical Surfaces Of Rigid Part Of Machine, Grabarczyk (Year: 1990).*

(Continued)

*Primary Examiner* — Cristi J Tate-Sims
(74) *Attorney, Agent, or Firm* — Harness, Dickey & Pierce, PLC

(57) ABSTRACT

A laundry appliance including an appliance housing, a wash unit tub disposed inside the appliance housing, a drum rotatably supported within the wash unit tub, and a wash water dispenser assembly. A laundry compartment is provided inside the drum and the drum is rotatable about a drum axis. The wash water dispenser assembly includes a dispenser hose and a mating interface assembly. The dispenser hose includes a dispenser hose inlet and a dispenser hose outlet. The mating interface assembly connects the dispenser hose outlet to the wash unit tub. The mating interface assembly includes a tub port adapter on the tub sidewall that extends outwardly away from the drum axis to provide a mechanical connection with the dispenser hose outlet.

17 Claims, 10 Drawing Sheets

(51) Int. Cl.
*D06F 37/26* (2006.01)
*F16L 37/098* (2006.01)
*F16L 37/244* (2006.01)

(56) References Cited

FOREIGN PATENT DOCUMENTS

| | | |
|---|---|---|
| DE | 102016206523 B3 | 6/2017 |
| EP | 2142697 A2 | 3/2008 |
| EP | 2267209 A1 | 12/2010 |
| JP | 2011147587 A | 8/2011 |

OTHER PUBLICATIONS

Miele; Miele Washing Machine; media.flixcar.com/delivery/minisite/show/2348/en/1147165; Aug. 27, 2021; 7 pgs.
Taizhou Haifeng Machinery Manufacturing Co., Ltd.; China Automatic Commercial Industrial Laundry Washing Extractor Machine; https://cnhaifeng.en.made-in-china.com/product/noemMLPxqAUF/China-Automatic-Commercial-Industrial-Laundry-Washing-Extractor-Machine; Aug. 27, 2021; 17 pages.
Website—Stainless Steel Tub Washing Machine; https://lejininternational.en.made-in-china.com/product/KZHmpTrJTxhA/China-100kg-Stainless-Steel-Tub-Washing-Machine-Industrial-Sample, Aug. 27, 2021; 2 pages.
YouTube Video; IFB Executive Plus Fully Automatic Washing Machine, Dismantling & Assembly; Mar. 1, 2017; 1 pg.
European Search Report for EP Application No. 22202602.3-1016, dated May 15, 2023 (59 Pages).

\* cited by examiner

MATING INTERFACE ASSEMBLY BETWEEN A DISPENSER HOSE AND WASH UNIT TUB OF A WASHER AND DRYER COMBINATION APPLIANCE

FIELD

The present disclosure relates generally to laundry appliances and more particularly to a mating interface assembly for connecting a wash water dispenser hose to the wash unit tub of a washer and dryer combination appliance.

BACKGROUND

The statements in this section merely provide background information related to the present disclosure and may not constitute prior art.

Laundry appliances (i.e., laundry machines, washing machines, and dryers) are prolific in both residential and commercial settings. Traditionally, separate washer and dryer machines have been used in tandem to clean and then dry laundry. However, there is a growing market for washer and dryer combination appliances where a single machine performs both the washing and drying functions, thereby eliminating the need for two separate machines. There are a number of different names used to describe washer and dryer combination appliances, including without limitation, "washer/dryer combos" and "all-in-one washer dryers." While these units save space compared to separate washer and dryer machines, combining the washing and drying functions into a single appliance presents a number of engineering challenges.

Many washer and dryer combination appliances have a front-load appliance configuration, where the washer and dryer combination appliance includes an appliance housing with a front appliance opening that is accessed by a front-mounted appliance door. Such wash dryer combination appliances typically have a wash unit tub that is supported inside the appliance housing on dynamic mounts that allow the wash unit tub to move and oscillate to some degree relative to the appliance housing. A drum is positioned inside the wash unit tub and is rotatable with respect to both wash unit tub and the appliance housing. A motor housed within the appliance housing rotates the drum. The drum typically has a front end with a drum opening that provides access to a laundry compartment inside the drum and a rear end opposite the front end that is coupled to the motor. During wash cycles, laundry in the laundry compartment repeatedly tumbles into water in the lower part of the drum and is then lifted back out of the water as the drum rotates. During drying cycles, warm air is blown through perforations at the rear end of the drum to permit air flow into the laundry compartment.

Front-load laundry appliances, including both washer and dryer combination appliances and traditional washing machines, also typically have a dispenser box in the upper left corner of the appliance housing with a drawer that can be pulled out from the front of the appliance. This drawer typically includes multiple compartments, windows, and/or trays for receiving a single dose of detergent, bleach, or fabric softener, which is mixed with water in the dispenser box during the wash cycle and then fed into the laundry compartment via a dispenser hose. Typically, the dispenser hose is connected to a front wall or front ring of the wash unit tub where the dispenser hose dispenses wash water (optionally mixed with detergent, bleach, and/or fabric softener) directly into the laundry compartment inside the drum.

SUMMARY

This section provides a general summary of the disclosure, and is not a comprehensive disclosure of its full scope or all of its features.

In accordance with one aspect of the present disclosure, a wash water dispenser assembly for a laundry appliance is provided where the wash water dispenser assembly includes a dispenser hose and a mating interface assembly. The dispenser hose includes a dispenser hose inlet and a dispenser hose outlet. The mating interface assembly includes a tub port adapter, which is configured to mechanically secure the dispenser hose outlet to a sidewall of a wash unit tub of the laundry appliance. The tub port adapter has a tubular portion that receives and extends circumferentially about a portion of the dispenser hose adjacent to the dispenser hose outlet.

In accordance with other aspects of the present disclosure, a laundry appliance is provided where the laundry appliance includes an appliance housing, a wash unit tub disposed inside the appliance housing, a drum rotatably supported within the wash unit tub, and a wash water dispenser assembly. The wash unit tub includes a tub sidewall. A laundry compartment is provided inside the drum and the drum is rotatable about a drum axis. The wash water dispenser assembly includes a dispenser hose and a mating interface assembly. The dispenser hose includes a dispenser hose inlet and a dispenser hose outlet and the mating interface assembly connects the dispenser hose outlet to the wash unit tub. The mating interface assembly includes a tub port adapter on the tub sidewall that extends outwardly away from the drum axis and provides a mechanical connection with the dispenser hose outlet.

In accordance with other aspects of the present disclosure, the mating interface assembly includes a tub port opening that extends through the tub sidewall. In accordance with this aspect of the present disclosure, the tub port adapter of the mating interface assembly extends circumferentially about the tub port opening in the tub sidewall and provides a mechanical connection with the dispenser hose outlet.

Unlike traditional designs where the dispenser hose extends through/mates with the front wall/front ring of the wash unit tub, in accordance with the present design, the dispenser hose outlet mates with a tub port adapter that is positioned on the tub sidewall. Re-routing the dispenser hose to connect to a tub port adapter on the tub sidewall is beneficial from a packaging standpoint because it provides more room (i.e., surface area) on the front ring of the wash unit tub to mount the front appliance door (via a hinge, for example). In addition, improved service life (i.e., durability) is possible by attaching the dispenser hose outlet to a tub port adapter instead of attaching the dispenser hose directly to the front ring or sidewall of the wash unit tub, which are thin metal walls that can cut or wear through the non-metal (e.g., rubber) dispenser hose over time due to oscillations of the wash unit tub during wash and drying cycles.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
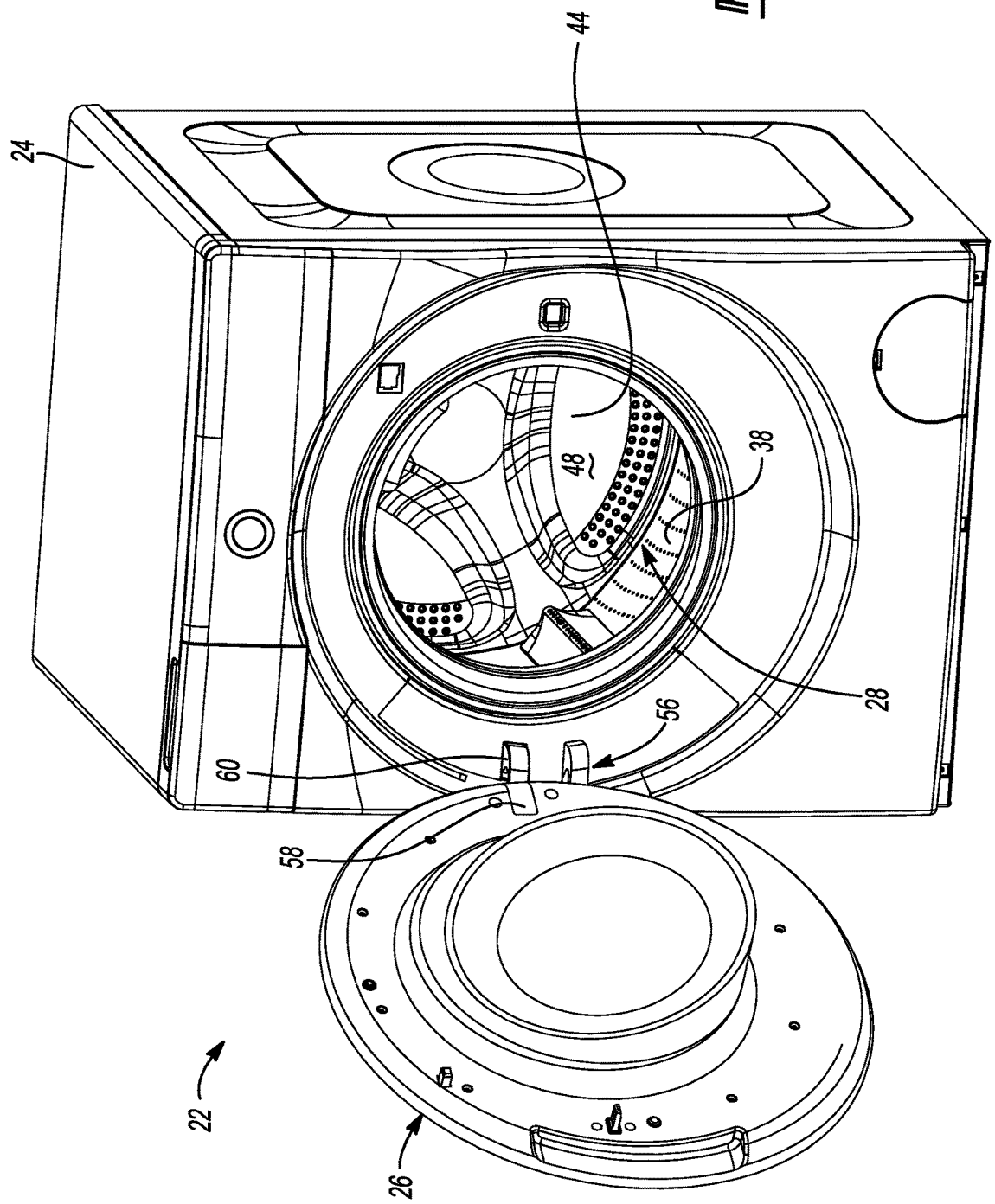
FIG. 1 is a front perspective view of an exemplary laundry appliance where the laundry appliance includes an appliance housing and a front appliance door that is illustrated in an open position.

Referring to the Figures, wherein like numerals indicate corresponding parts throughout the several views, a wash water dispenser assembly 20 of a laundry appliance 22 is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

For purposes of description herein the terms "up," "down," "above," "below," "upper," "lower," "top," "bottom," "front," "rear," and derivatives thereof shall relate to the assembly as oriented in FIGS. 1-13. However, it is to be understood that the apparatus and assemblies described herein may assume various alternative orientations. In addition, the term "water," "wash water," and "fluid" are used interchangeably herein to generally refer to wash water, which may be water or a water based mixture, solution, or suspension, such as water mixed with a detergent, bleach, and/or fabric softener for example and without limitation. In addition, it should be appreciated that the wash water may contain fresh water that is supplied from an external source, water that is recirculated within the laundry appliance 22, or a combination of fresh water and recirculated water.

The laundry appliance 22 illustrated in the example provided in FIG. 1 has a front-load configuration and includes an appliance housing 24 that is rectangular in shape. The laundry appliance 22 includes a front appliance door 26 that is pivotally connected to the laundry appliance 22 to open and close a front opening 28 in the appliance housing 24. With additional reference to FIG. 2, the laundry appliance 22 includes a wash unit tub 30 that is mounted inside the appliance housing 24. The wash unit tub 30 is generally cylindrical in shape, but does not rotate relative to the appliance housing 24. The wash unit tub 30 is supported within the appliance housing 24 by dynamic mounts 32 that give the wash unit tub 30 a limited degree of freedom, which allows the wash unit tub 30 to move/oscillate relative to the appliance housing 24 during the wash and drying cycles of the laundry appliance 22. The wash unit tub 30 includes a tub opening 34 that leads to a tub cavity 36 inside the wash unit tub 30.

A drum 38 is positioned inside the tub cavity 36 and is rotatably supported within the wash unit tub 30 such that the drum 38 is rotatable with respect to the wash unit tub 30 about a drum axis 40. Because the laundry appliance 22 in the illustrated examples has a front-load configuration, it should be appreciated that the drum axis 40 extends horizontally or at an angle that is less than 20 degrees from horizontal. The drum 38 has a front end 42, a rear end 44, and a cylindrical shape. A drum opening 46 at the front end 42 of the drum 38 provides access to a laundry compartment 48 inside the drum 38. Thus, it should be appreciated that in use, laundry (e.g., clothes, towels, and bedding) is placed inside the laundry compartment 48 where it is first cleaned during a wash cycle and then dried during a drying cycle. A drive shaft (not shown) is fixedly coupled to the read end of the drum 38. The drive shaft is supported by a bearing pack (not shown) such that the drive shaft and the drum 38 rotate together as a single unit within the wash unit tub 30. A motor (not shown) is positioned in the appliance housing 24, behind the drum 38, and is coupled to the drive shaft. The motor drives rotation of the drive shaft and the drum 38 relative to the wash unit tub 30 and the appliance housing 24 during operation of the laundry appliance 22, such as during washing and tumbling.

The wash unit tub 30 includes a front ring 50, a rear tub wall 52, and a tub sidewall 54 that extends longitudinally from the front ring 50 to the rear tub wall 52. The front ring 50 is made of a rigid material and preferably metal. The rigidity and strength of the front ring 50 is particularly important in the illustrated example because the front appliance door 26 is pivotally mounted to the front ring 50 of the drum 38 housing by a hinge 56. More specifically, the hinge 56 includes a first leaf 58 that is fixedly secured to the front appliance door 26 and a second leaf 60 that is fixedly secured to the front ring 50 of the drum 38 housing. Because the front appliance door 26 is mounted to the front ring 50, the rigidity and strength of the entire wash unit tub 30 is more important than in designs where the front appliance door 26 is pivotally mounted to the appliance housing 24. As a result, the rear tub wall 52 and tub sidewall 54 are also made from a rigid material and preferably metal. The tub sidewall 54 is generally cylindrical and includes an inner sidewall surface 62 that faces the drum 38 and an outer sidewall surface 64 that faces the appliance housing 24. Optionally, one or more suspension support brackets 66 may be fixed to or integrated in the tub sidewall 54 to provide additional rigidity and/or an attachment point for the dynamic mounts 32 that support the wash unit tub 30 within the appliance housing 24.

Figure 2:
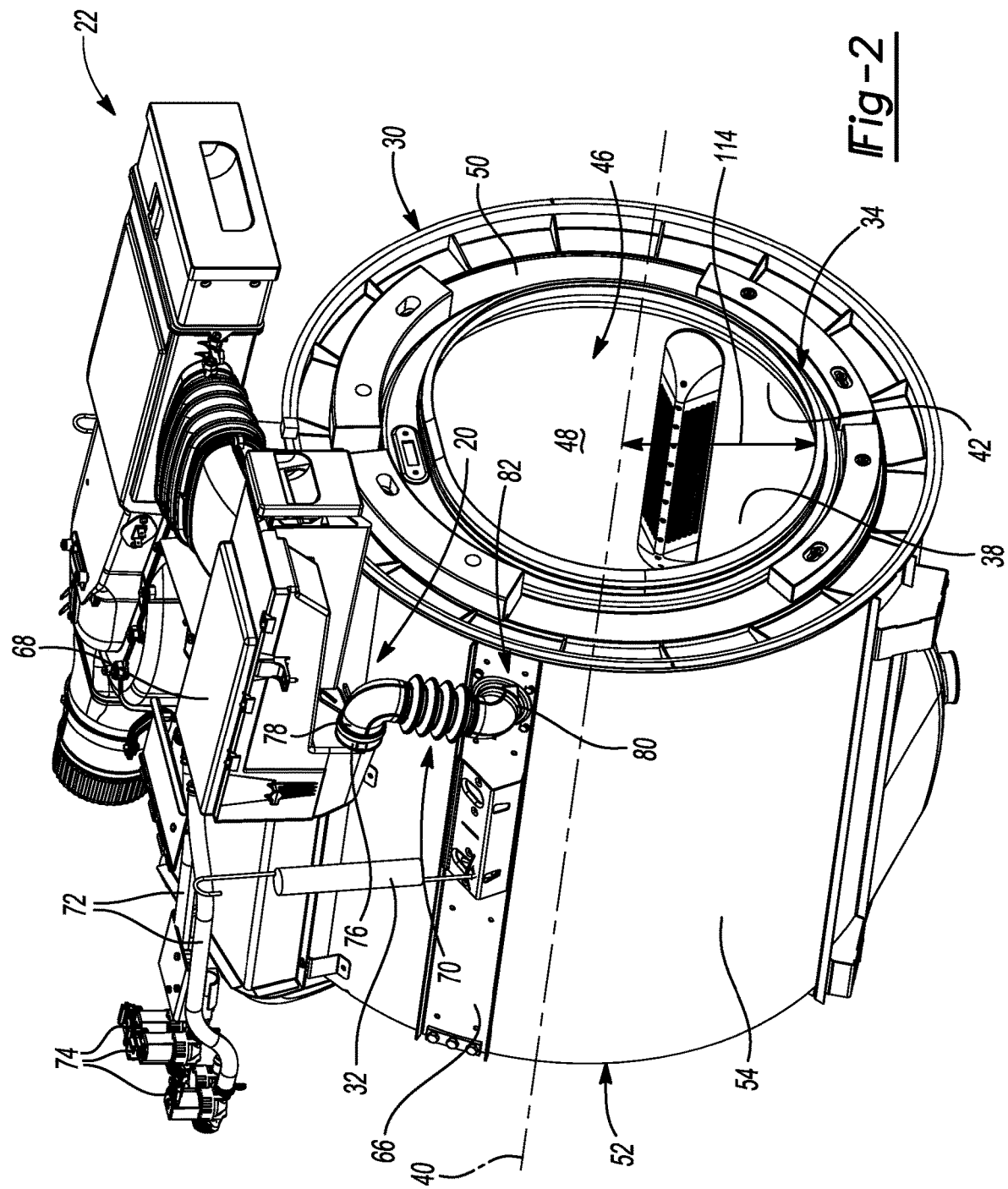
FIG. 2 is a front perspective view of part of an exemplary laundry appliance where the appliance housing and front appliance door shown in FIG. 1 have been removed to reveal several components of the laundry appliance, including an exemplary wash water dispenser assembly and wash unit tub that have been constructed in accordance with the present disclosure.
Figure 3:
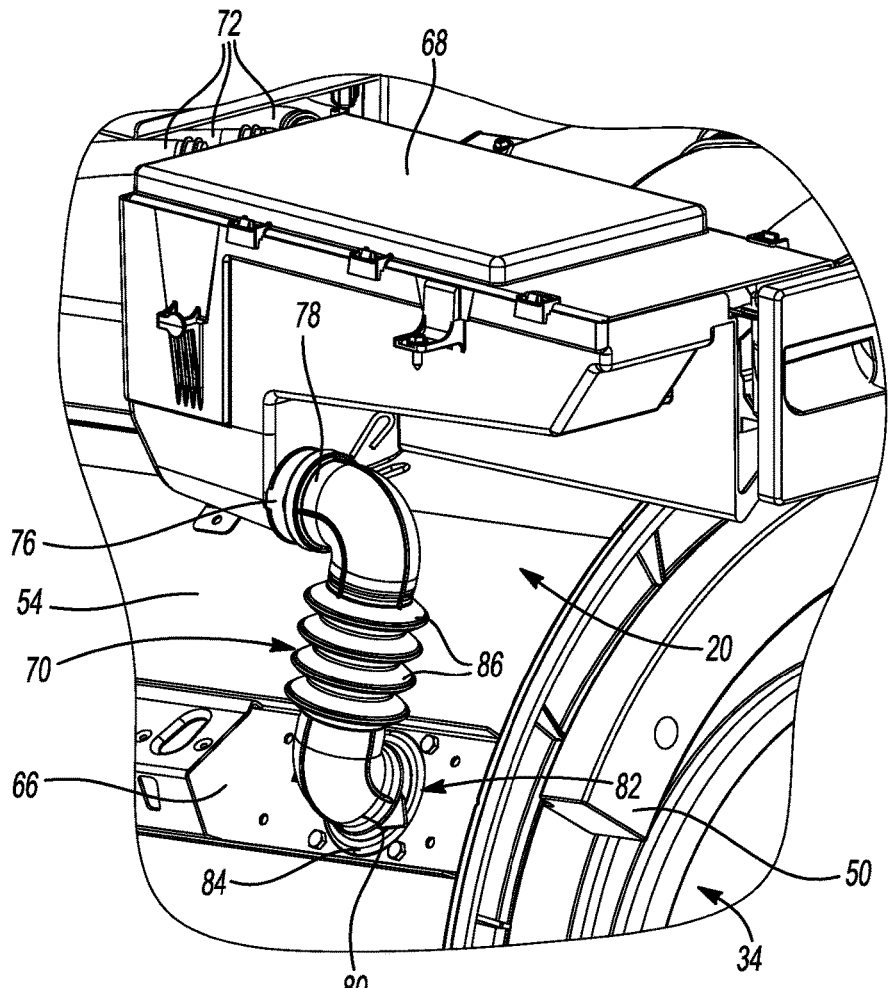
FIG. 3 is a side perspective view of the exemplary wash water dispenser assembly shown in FIG. 2, which includes a dispenser hose that is connected to the wash unit tub by a mating interface assembly.

With reference to FIGS. 2 and 3, the wash water dispenser assembly 20 of the laundry appliance 22 includes a dispenser box 68 and a dispenser hose 70. The dispenser box 68 is fixedly mounted inside the appliance housing 24 at a position in the upper left corner, towards the front of the laundry appliance 22. The dispenser box 68 is connected to one or more water inlet lines 72 that are connected in fluid communication with one or more water inlet valves 74 mounted at the rear of the laundry appliance 22. The dispenser box 68 also includes a water outlet port 76 near the bottom of the dispenser box 68. The dispenser hose 70 extends from a dispenser hose inlet 78 to a dispenser hose outlet 80. The dispenser hose inlet 78 is connected to the water outlet port 76 of the dispenser box 68, while the dispenser hose outlet 80 is connected to a mating interface assembly 82 that includes a tub port adapter 84 positioned on the tub sidewall 54. As a result, water in the dispenser box 68 drains down through the water outlet port 76, travels through the dispenser hose 70, and into the wash unit tub 30 through the tub port adapter 84 during a wash cycle. The dispenser hose 70 is made of a resilient, non-metal material and includes tubular bellows 86 that allow the dispenser hose 70 to flex and accommodate movements and oscillations of the wash unit tub 30. By way of example and without limitation, the dispenser hose 70 may be made of rubber.

The dispenser box 68 functions to create/produce a water pressure drop between the water inlet ports and the water outlet port 76. By way of example and without limitation, the water pressure at the water inlet ports may have a nominal pressure of about 80 pounds per square inch (PSI). This water collects in the dispenser box 68, which acts like a reservoir, and drains out through the water outlet port 76 under the influence of gravity. As a result, the water pressure at the water outlet port 76 of the dispenser box 68 is simply the head pressure caused by the height of the water in the dispenser box 68 and is therefore considerably less than the water pressure at the water inlet ports.

Figure 4:
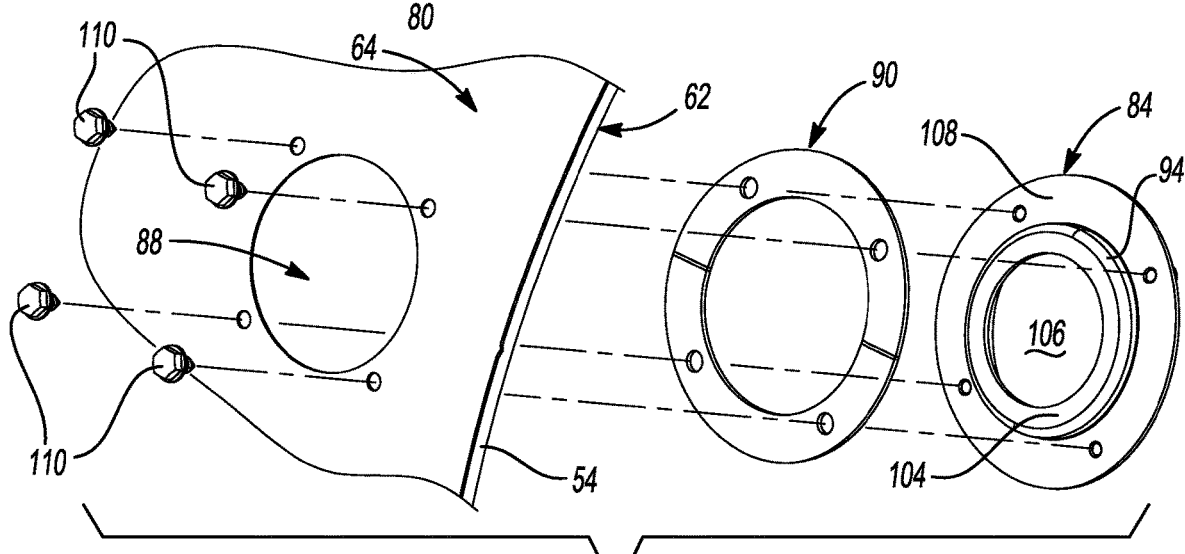
FIG. 4 is an exploded perspective view of part of the exemplary mating interface assembly shown in FIG. 3.
Figure 5:
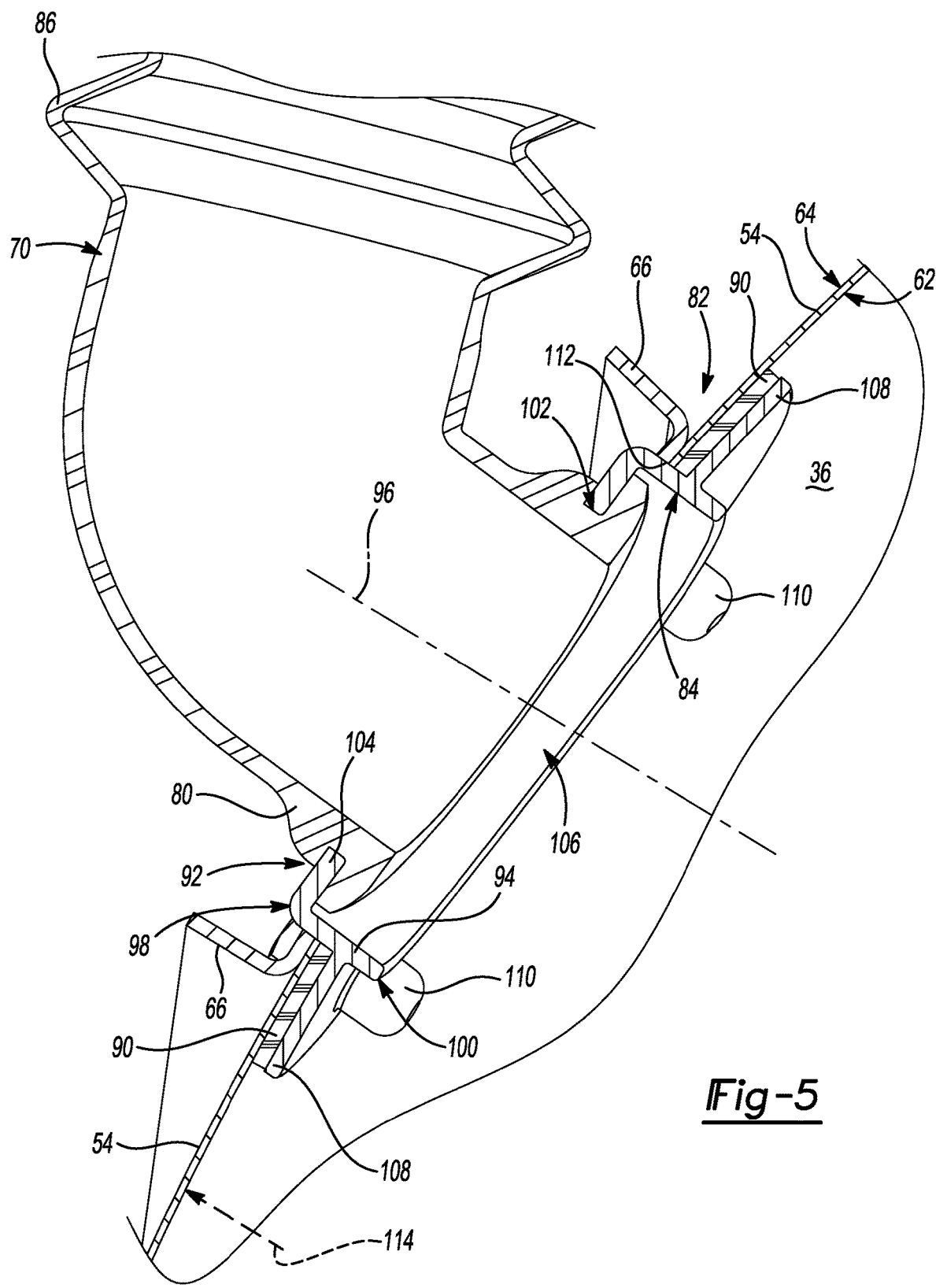
FIG. 5 is a side cross-sectional view of the exemplary mating interface assembly shown in FIG. 3.

With reference to FIGS. 3-5, the mating interface assembly 82 between the dispenser hose outlet 80 and the tub sidewall 54 includes the tub port adapter 84, a tub port opening 88 in the tub sidewall 54 that is arranged to receive at least part of the tub port adapter 84, and a seal 90 that is positioned between the tub sidewall 54 and the tub port adapter 84. The tub port adapter 84 on the tub sidewall 54 extends outwardly away from the drum axis 40 to provide a mechanical connection 92 with the dispenser hose outlet 80 that is outwardly spaced from the outer sidewall surface 64 of the wash unit tub 30. As such, it should be appreciated that the tub port adapter 84 is configured to secure the dispenser hose outlet 80 to the tub sidewall 54 of the wash unit tub 30.

The tub port adapter 84 includes a tubular portion 94 that extends annularly about an adapter axis 96 and axially between an inlet end 98 and an outlet end 100. While the adapter axis 96 extends perpendicularly relative to the drum axis 40 in the Figures, it should be appreciated that alternatively, the adapter axis 96 may extend at an oblique angle relative to the drum axis 40. A groove 102 extends circumferentially about the dispenser hose 70 near the dispenser hose outlet 80. The inlet end 98 of the tub port adapter 84 includes an adapter flange 104 that extends radially inwardly toward the adapter axis 96 and into the groove 102 in the dispenser hose 70 to form a tongue-and-groove connection 92 between the tub port adapter 84 and the dispenser hose outlet 80. The outlet end 100 of the tub port adapter 84 includes a wash water discharge opening 106 that is configured to dispense wash water (optionally mixed with detergent, bleach, and/or fabric softener) directly into the tub cavity 36 inside the wash unit tub 30.

The tub port adapter 84 also includes a collar 108 located between the inlet and outlet ends 98, 100 that extends radially outwardly from the tubular portion 94 of the tub port adapter 84 and away from the adapter axis 96. The collar 108 of the tub port adapter 84 is configured to mate with the sidewall 54 of the wash unit tub 30 and includes a plurality of holes that are threaded and configured to receive fasteners 110. It should be appreciated that a wide variety of fasteners 110 can be used, including without limitation, screws, bolts, and rivets. Alternatively, the tub port adapter 84 could be attached to the tub sidewall 54 using adhesive, welding, or injection molding, for example.

As shown in FIGS. 4 and 5, the tubular portion 94 of the tub port adapter 84 is configured to be inserted in and extend through the tub port opening 88 in the tub sidewall 54 and a cut-out 112 in the suspension support bracket 66 until the collar 108 is positioned against and abuts the inner sidewall surface 62 of the wash unit tub 30. The seal 90 of the mating interface assembly 82 is configured to be positioned/sandwiched between the collar 108 of the tub port adapter 84 and the inner sidewall surface 62. The seal 90 has an annular shape and extends circumferentially about the tub port opening 88 to prevent leaks. The tub sidewall 54, the suspension support bracket 66, and the seal 90 all have holes that are aligned with the holes in the collar 108 of the tub port adapter 84 and the fasteners 110 extend through the holes such that the seal 90 is clamped between the collar 108 of the tub port adapter 84 and the tub sidewall 54. It should also be appreciated that the tub sidewall 54 is generally cylindrical in shape and is curved along a sidewall radius 114. The collar 108 is congruently curved and follows the sidewall radius 114 such that the collar 108 and the seal 90 sit flat against tub sidewall 54.

Preferably, the tub port adapter 84 is made of a non-metal, such as a polymer (e.g., plastic). As previously mentioned, the tub sidewall 54 is preferably made of metal for improved rigidity and the dispenser hose 70 is made of a non-metal, such as rubber. Because the tub port adapter 84 is made of a non-metal, such as a polymer, the tub port adapter 84 eliminates a metal to non-metal mating interface between the tub sidewall 54 and the dispenser hose 70. This improves service life (i.e., durability) because it prevents the thin metal wall of the wash unit tub 30 from cutting or wearing through the non-metal (e.g., rubber) dispenser hose 70 over time due to oscillations of the wash unit tub 30 during wash and drying cycles. Also, by re-routing the dispenser hose 70 to connect to the tub port adapter 84 on the tub sidewall 54 frees up space (i.e., surface area) on the front ring 50 of the wash unit tub 30 to which the hinge 56 for the front appliance door 26 can be mounted.

Figure 6:
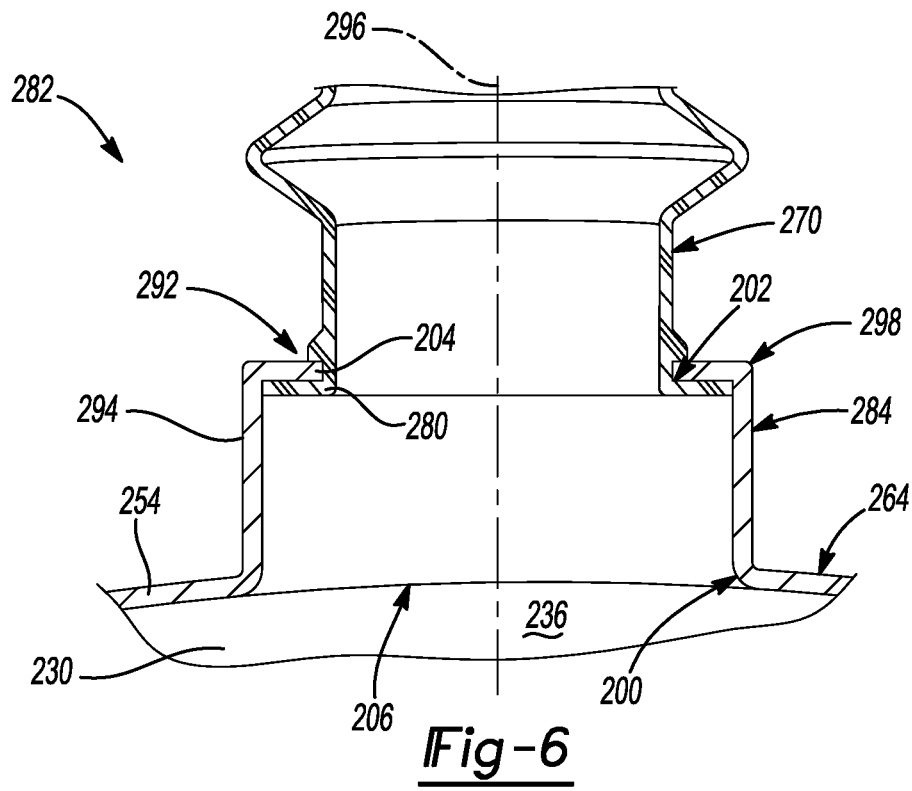
FIG. 6 is a side cross-sectional view of another exemplary mating interface assembly for connecting the dispenser hose to the wash unit tub.

FIG. 6 illustrates another exemplary mating interface assembly 282, which has a tub port adapter 284 that is constructed in accordance with an alternative configuration. The other elements of the laundry appliance 22 and wash water dispenser assembly 20 described above are the same or substantially similar to the elements shown in FIG. 6, but have been labeled with reference numerals in the 200s in FIG. 6. As such, the above description of FIGS. 1-5 applies equally to the components shown in FIG. 6, except as otherwise noted. For example, the tub sidewall 254 in FIG. 6 corresponds to the tub sidewall 54 in FIGS. 1-5 and the above description of the tub sidewall 54 applies equally to tub sidewall 254.

The mating interface assembly 282 illustrated in FIG. 6 includes a tub port adapter 284 that is integrally formed on the tub sidewall 254 of the wash unit tub 230. As such, the tub port adapter 284 in this embodiment is either made of the same material as the tub sidewall 254 (which could be metal or non-metal), or alternatively, could be made of a different material that is injection molded, co-molded, or otherwise co-formed with the tub sidewall 254. As such, the collar 108, seal 90, and fasteners 110 used in the design shown in FIGS. 1-5 are eliminated in the design shown in FIG. 6.

Again, the tub port adapter 284 extends outwardly away from the drum axis 40 to provide a mechanical connection 292 with the dispenser hose outlet 280 that is outwardly spaced from the outer sidewall surface 264 of the wash unit tub 230. As such, it should be appreciated that the tub port adapter 284 is configured to secure the dispenser hose outlet 280 to the tub sidewall 254. A tubular portion 294 of the tub port adapter 284 extends annularly about an adapter axis 296 and axially between an inlet end 298 and an outlet end 200. A groove 202 extends circumferentially about the dispenser hose 270 near the dispenser hose outlet 280 and the inlet end 298 of the tub port adapter 284 includes an adapter flange 204 that extends radially inwardly toward the adapter axis 296 and into the groove 202 in the dispenser hose 270 to form a tongue-and-groove connection 292 between the tub port adapter 284 and the dispenser hose outlet 280. The outlet end 200 of the tub port adapter 284 includes a wash water discharge opening 206 that is configured to dispense wash water (optionally mixed with detergent, bleach, and/or fabric softener) directly into the tub cavity 236 inside the wash unit tub 230.

Figure 7:
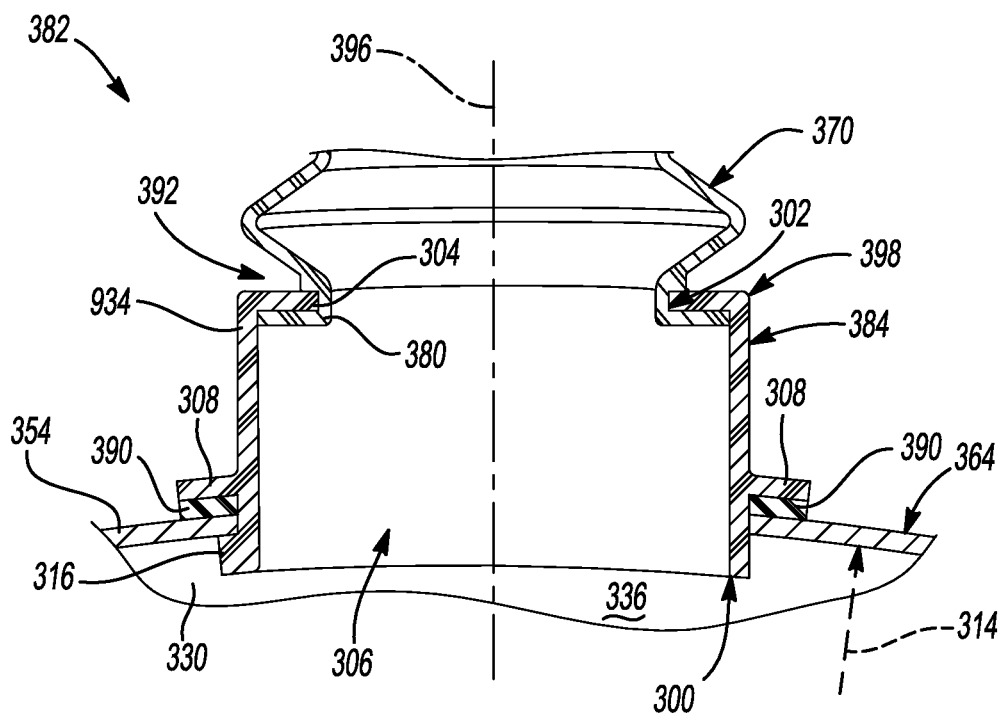
FIG. 7 is a side cross-sectional view of yet another exemplary mating interface assembly for connecting the dispenser hose to the wash unit tub, which includes a tub port adapter that extends through a tub port opening in the wash unit tub.
Figure 8:
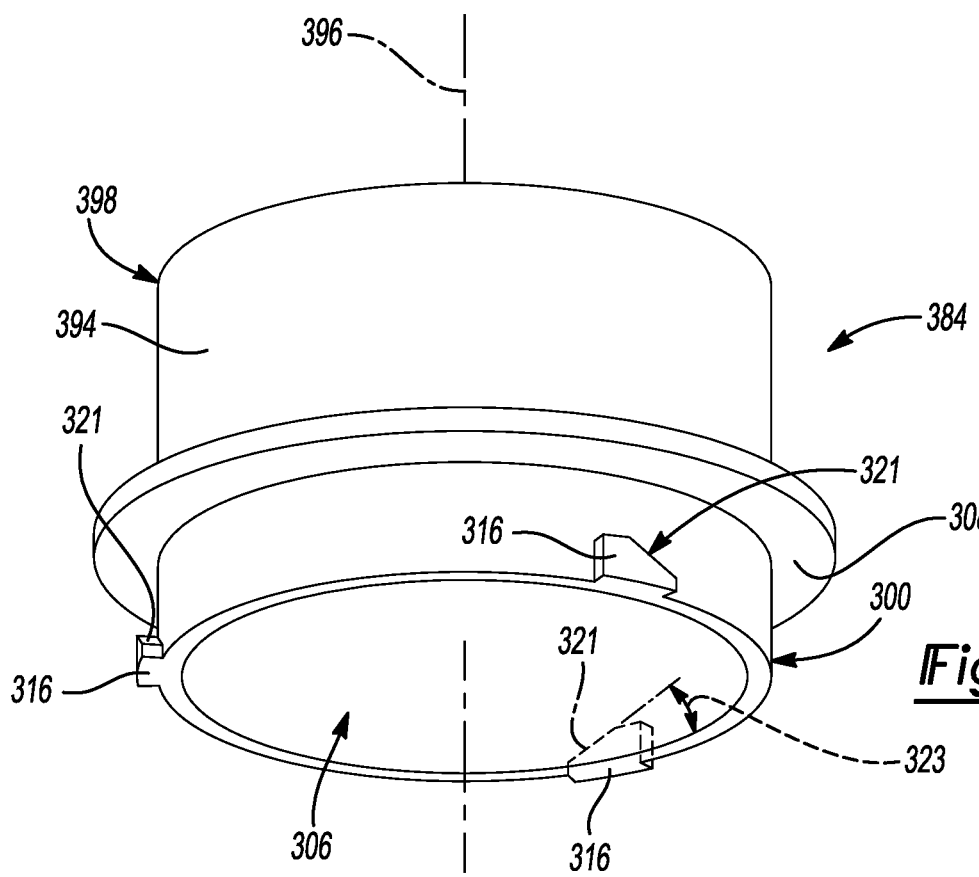
FIG. 8 is a side perspective view of the tub port adapter of the mating interface assembly illustrated in FIG. 7.
Figure 9:
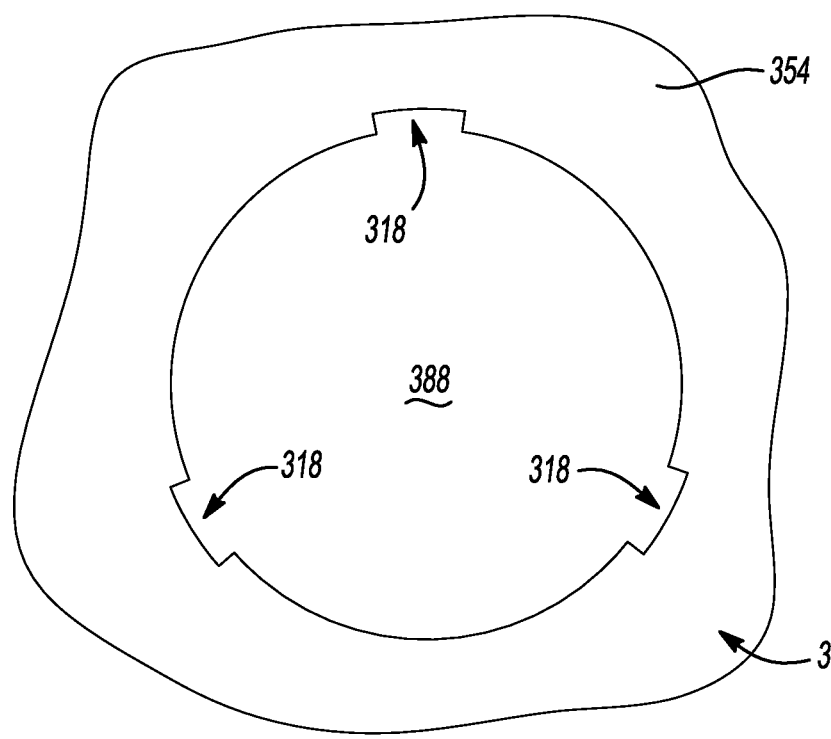
FIG. 9 is a side elevation view of the tub port opening that receives the tub port adapter illustrated in FIG. 8.

FIGS. 7-9 illustrate another exemplary mating interface assembly 382, which has a tub port adapter 384 and a tub port opening 388 that are constructed in accordance with an alternative configuration. The other elements of the laundry appliance 22 and wash water dispenser assembly 20 described above in connection with FIGS. 1-5 are the same or substantially similar to the elements shown in FIGS. 7-9, but have been labeled with reference numerals in the 300s in FIGS. 7-9. As such, the above description of FIGS. 1-5 applies equally to the components shown in FIGS. 7-9, except as otherwise noted. For example, the tub sidewall 354 in FIGS. 7-9 corresponds to the tub sidewall 54 in FIGS. 1-5 and the above description of the tub sidewall 54 applies equally to tub sidewall 354.

Like before, the mating interface assembly 382 illustrated in FIGS. 7-9 includes a tub port adapter 384, a tub port opening 388 in the tub sidewall 354 that is arranged to receive at least part of the tub port adapter 384, and a seal 390 that is positioned between the tub sidewall 354 and the tub port adapter 384. The tub port adapter 384 extends outwardly away from the drum axis 40 to provide a mechanical connection 392 with the dispenser hose outlet 380 that is outwardly spaced from the outer sidewall surface 364 of the wash unit tub 330. As such, it should be appreciated that the tub port adapter 384 is configured to secure the dispenser hose outlet 380 to the tub sidewall 354 of the wash unit tub 330.

Again, the tub port adapter 384 includes a tubular portion 394 that extends annularly about an adapter axis 396 and axially between an inlet end 398 and an outlet end 300. A groove 302 extends circumferentially about the dispenser hose 370 near the dispenser hose outlet 380 and the inlet end 398 of the tub port adapter 384 includes an adapter flange 304 that extends radially inwardly toward the adapter axis 396 and into the groove 302 in the dispenser hose 370 to form a tongue-and-groove connection 392 between the tub port adapter 384 and the dispenser hose outlet 380. The outlet end 300 of the tub port adapter 384 includes a wash water discharge opening 306 that is configured to dispense wash water (optionally mixed with detergent, bleach, and/or fabric softener) directly into the tub cavity 336 inside the wash unit tub 330.

The tub port adapter 384 includes a collar 308 located between the inlet and outlet ends 398, 300 that extends radially outwardly from the tubular portion 394 of the tub port adapter 384 and away from the adapter axis 396. The collar 308" of the tub port adapter 384 is configured to mate with the tub sidewall 354 of the wash unit tub 330. The tubular portion 394 of the tub port adapter 384 is configured to be inserted in and extend through the tub port opening 388 in the tub sidewall 354 until the collar 308 is positioned against and abuts the outer sidewall surface 364 of the wash unit tub 330. The seal 390 of the mating interface assembly 382 is configured to be positioned/sandwiched between the collar 308 of the tub port adapter 384 and the outer sidewall surface 364 in this embodiment. Like before, the seal 390 has an annular shape and extends circumferentially about the tub port opening 388 to prevent leaks. It should also be appreciated that the tub sidewall 354 may be cylindrical in shape and may be curved along a sidewall radius 314. As a result, the collar 308 may be congruently curved to follow the sidewall radius 314.

In accordance with this embodiment, the mating interface assembly 382 further comprises one or more twist-lock projections 316 on the tub port adapter 384 that are configured to be received in one or more twist-lock receptacles 318 in the tub port opening 388 in the wash unit tub 330. In the illustrated example, the twist-lock projections 316 extend radially outwardly from the outlet end 300 of the tubular portion 394 of the tub port adapter 384 and have a ramp-like shape with an inclined surface 321 that faces up towards said collar 308 at an angle 323. The size, location, and shape of the twist-lock receptacles 318 are such that they receive the twist-lock projections 316 on the tub port adapter 384 as the outlet end 300 of the tub port adapter 384 is inserted into the tub port opening 388. Rotation of the tub port adapter 384 causes the inclined surfaces 321 of the twist-lock projections 316 to contact the edges of the twist-lock receptacles 318, which urges the tubular portion 394 of the tub port adapter 384 further into the tub port opening 388 until the collar 308 and seal 390 are seated against the outer sidewall surface 364 of the wash unit tub 330. As a result, the fasteners 110 used in the design illustrated in FIGS. 1-5 are eliminated in the design shown in FIGS. 7-9.

Figure 10:
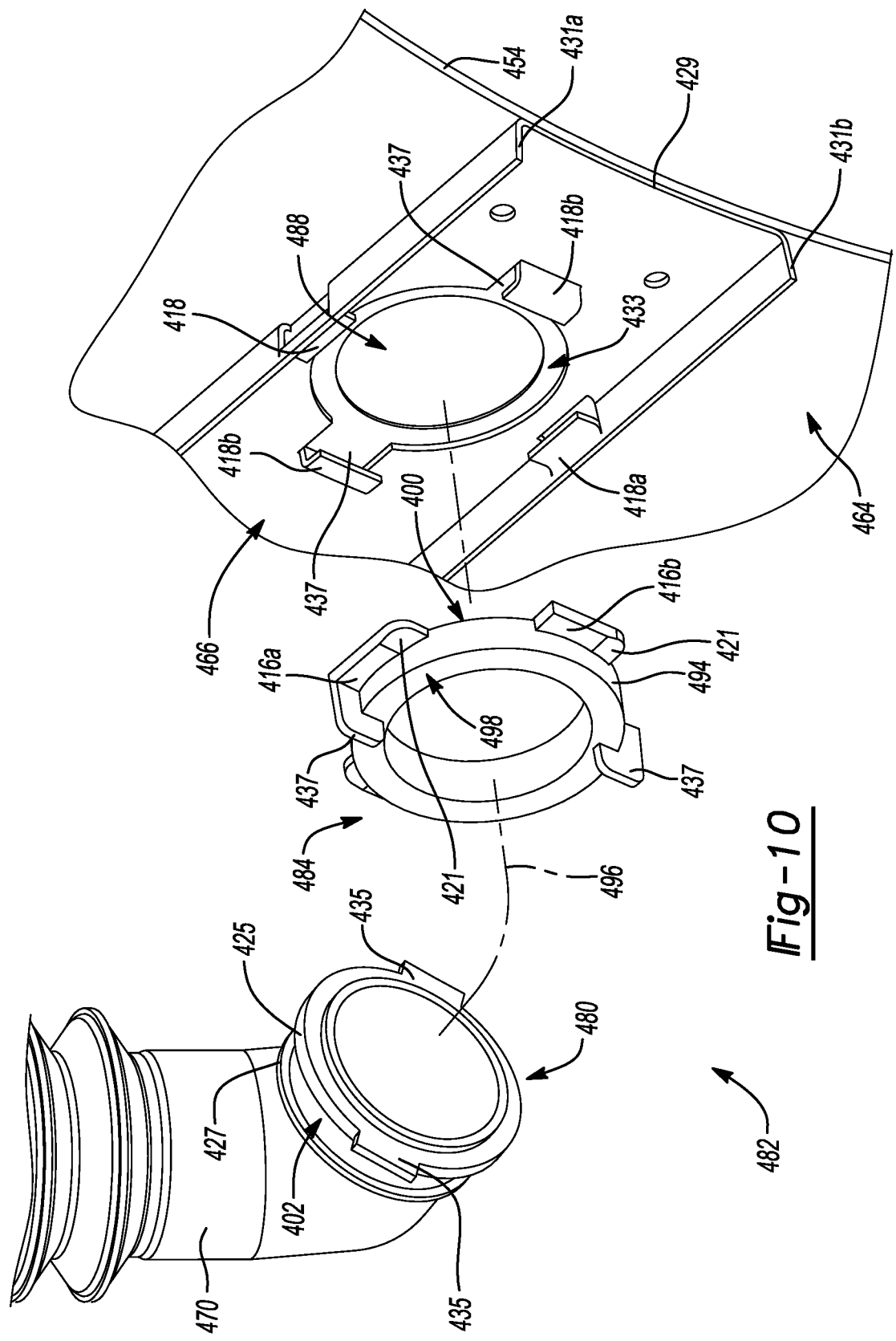
FIG. 10 is an exploded perspective view of another exemplary mating interface assembly for connecting a dispenser hose to the wash unit tub.
Figure 11:
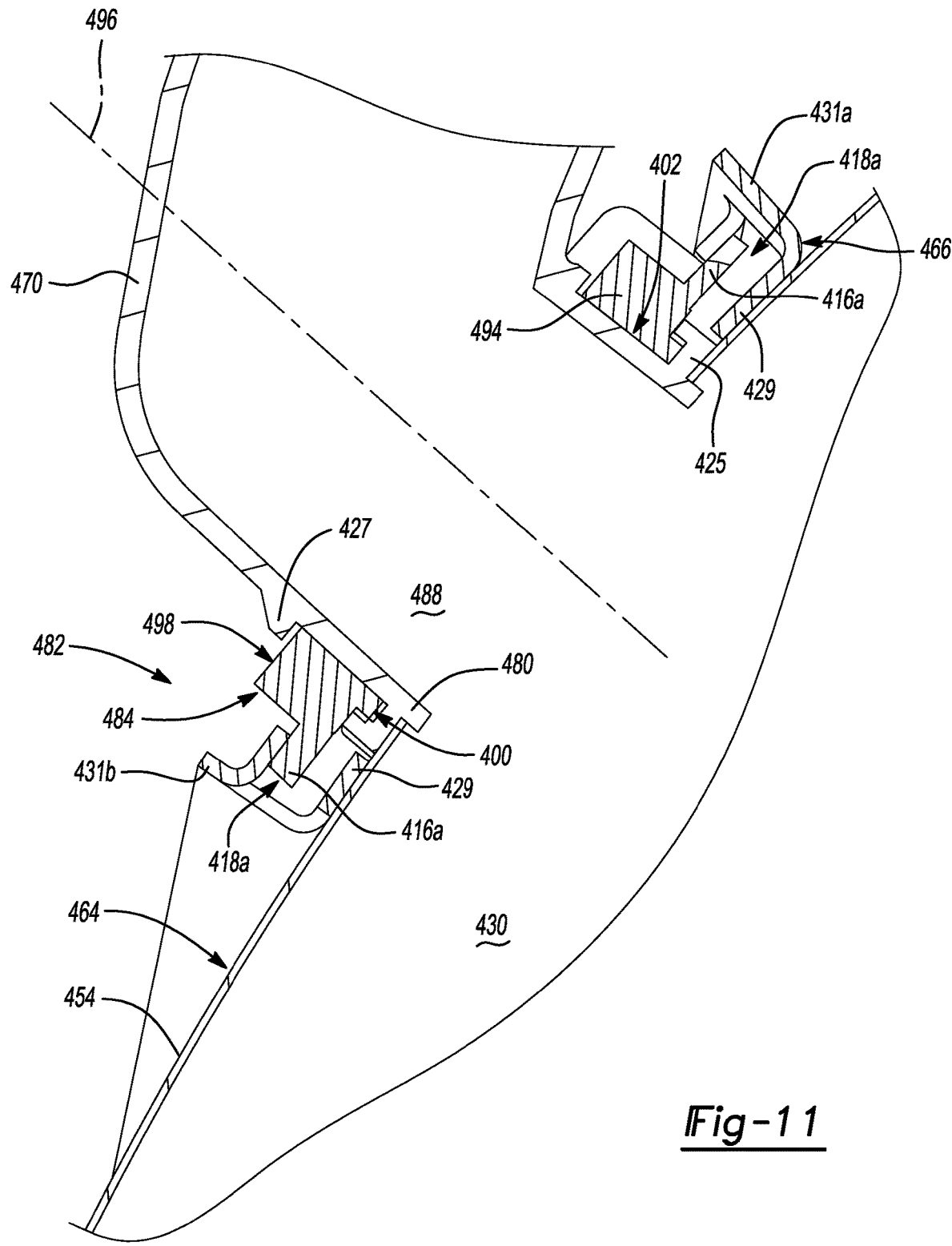
FIG. 11 is a side cross-sectional view of the exemplary mating interface assembly illustrated in FIG. 10.

FIGS. 10 and 11 illustrate another exemplary mating interface assembly 482, which has a tub port adapter 484 and a tub port opening 488 that are constructed in accordance with an alternative configuration. The other elements of the laundry appliance 22 and wash water dispenser assembly 20 described above in connection with FIGS. 1-5 are the same or substantially similar to the elements shown in FIGS. 10 and 11, but have been labeled with reference numerals in the 400s in FIGS. 10 and 11. As such, the above description of FIGS. 1-5 applies equally to the components shown in FIGS. 10 and 11, except as otherwise noted. For example, the tub sidewall 454 in FIGS. 10 and 11 corresponds to the tub sidewall 54 in FIGS. 1-5 and the above description of the tub sidewall 54 applies equally to tub sidewall 454.

Like before, the mating interface assembly 482 illustrated in FIGS. 10 and 11 includes a tub port adapter 484, a tub port opening 488 in the tub sidewall 454 that is arranged to receive at least part of the tub port adapter 484. As such, it should be appreciated that the tub port adapter 484 is configured to secure the dispenser hose outlet 480 to the tub sidewall 454 of the wash unit tub 430.

Again, the tub port adapter 484 includes a tubular portion 494 that extends annularly about an adapter axis 496 and axially between an inlet end 498 and an outlet end 400. A dispenser hose flange 425 and a dispenser hose shoulder 427 extend circumferentially about the dispenser hose 470 near the dispenser hose outlet 480 at longitudinally spaced locations to define a groove 402 that receives the tubular portion 494 of the tub port adapter 484, where the dispenser hose flange 425 abuts the outlet end 400 of the tub port adapter 484 and the dispenser hose shoulder 427 abuts the inlet end 498 of the tub port adapter 484.

As previously discussed, the wash unit tub 430 includes suspension support brackets 466 that are fixed to the tub sidewall 454. Each suspension support bracket 466 includes a base wall 429 and two outwardly turned edge walls 431a, 431b. The suspension support bracket 466 closest to the dispenser box 68 includes a dispenser hose cut-out 433 that is concentrically arranged about the tub port opening 488 in the tub sidewall 454. The dispenser hose cut-out 433 is larger in diameter than the tub port opening 488 and is configured to receive the dispenser hose flange 425 such that the dispenser hose flange 425 abuts the outer sidewall surface 464 of the wash unit tub 430 and is clamped between the outlet end 400 of the tub port adapter 484 and the tub sidewall 454. Therefore, in this embodiment, the dispenser hose flange 425 extends circumferentially about the tub port opening 488 to prevent leaks. Optionally, the dispenser hose flange 425 may also include one or more ears 435 that extend radially outwardly from the dispenser hose flange 425 and the dispenser hose cut-out 433 may include one or more notches 437 that are arranged to receive the ears 435 on the dispenser hose flange 425 and prevent rotation (i.e., twisting) of the dispenser hose outlet 480 relative to the suspension support bracket 466.

In accordance with this embodiment, the mating interface assembly 482 further comprises one or more twist-lock projections 416a, 416b on the tub port adapter 484 that are configured to be received in one or more twist-lock receptacles 418a, 418b in the suspension support bracket 466 that are arranged at circumferentially spaced locations about the tub port opening 488 in the wash unit tub 430. The twist-lock receptacles 418a, 418b may be formed as tabs that are cut out of and bent away from the base wall 429 and two outwardly turned edge walls 431a, 431b of the suspension support bracket 466. The twist-lock projections 416a, 416b extend radially outwardly from the outlet end 400 of the tubular portion 494 of the tub port adapter 484 and have a ramp-like shape with an inclined surface 421 that faces up towards the tabs forming the twist-lock receptacles 418a, 418b. The size, location, and shape of the twist-lock receptacles 418a, 418b are such that they receive the twist-lock projections 416a, 416b, respectively. Rotation of the tub port adapter 484 about the adapter axis 496 causes the inclined surfaces 421 of the twist-lock projections 416a, 416b to contact the tabs forming the twist-lock receptacles 418a, 418b, which urges the tubular portion 494 of the tub port adapter 484 toward the tub sidewall 454, pressing the dispenser hose flange 425 against the outer sidewall surface 464 of the wash unit tub 430 to seal the dispenser hose outlet 480 against the tub sidewall 454. Two of the twist-lock projections 416a include stops 437 that are arranged to contact the tabs that form two of the twist-lock receptacles 418a to prevent over-rotation of the tub port adapter 484 and to provide features that can be easily grasped during assembly and/or disassembly. Again, the fasteners 110 used in the design illustrated in FIGS. 1-5 are eliminated in the design shown in FIGS. 10 and 11.

Figure 12:
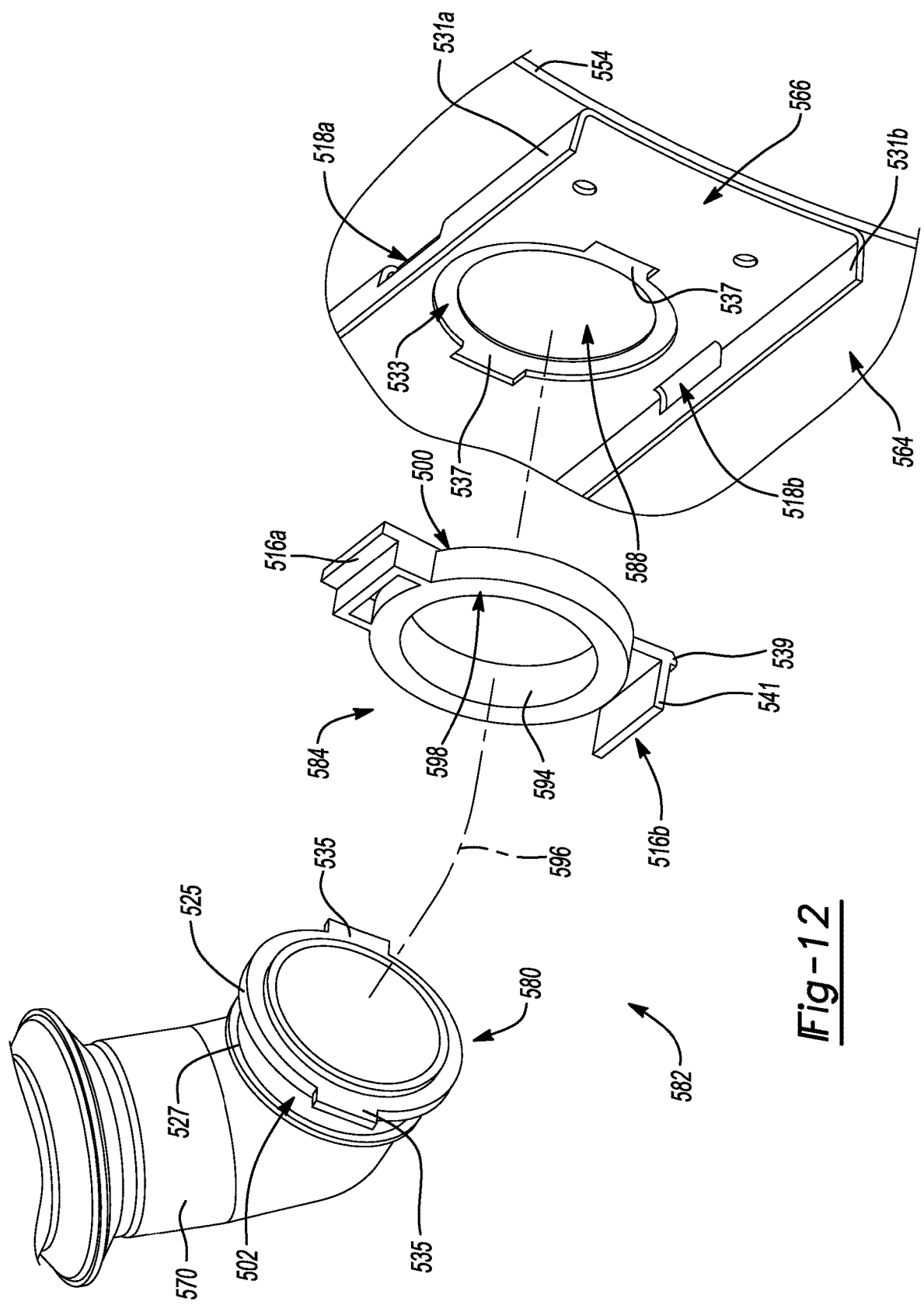
FIG. 12 is an exploded perspective view of another exemplary mating interface assembly for connecting a dispenser hose to the wash unit tub.
Figure 13:
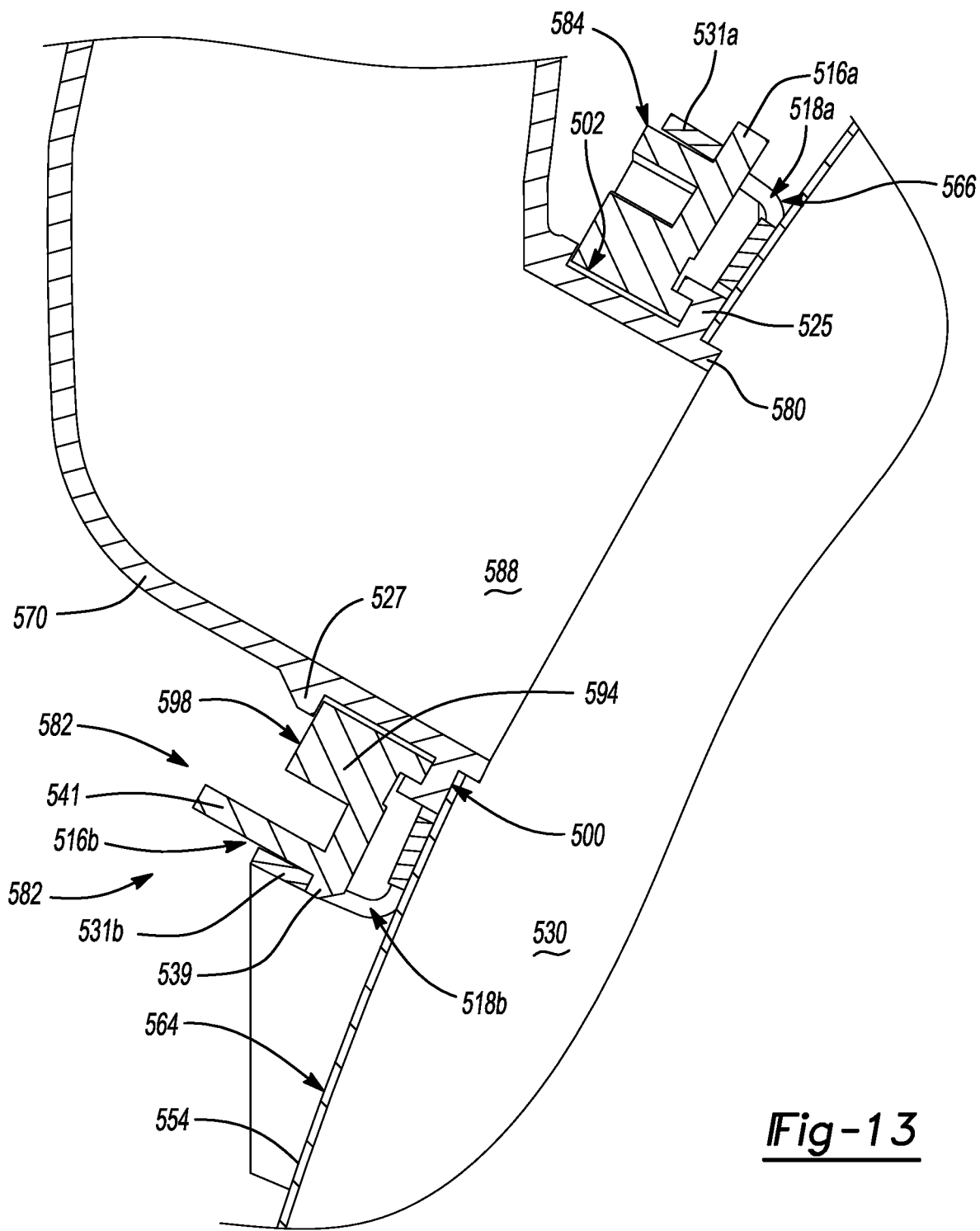
FIG. 13 is a side cross-sectional view of the exemplary mating interface assembly illustrated in FIG. 12.

FIGS. 12 and 13 illustrate another exemplary mating interface assembly 582, which has a tub port adapter 584 and a tub port opening 588 that are constructed in accordance with an alternative configuration. The other elements of the laundry appliance 22 and wash water dispenser assembly 20 described above in connection with FIGS. 1-5, 10, and 11 are the same or substantially similar to the elements shown in FIGS. 12 and 13, but have been labeled with reference numerals in the 500s in FIGS. 12 and 13. As such, the above description of FIGS. 1-5, 10, and 11 applies equally to the components shown in FIGS. 12 and 13, except as otherwise noted. For example, the tub sidewall 554 in FIGS. 12 and 13 corresponds to the tub sidewall 54 in FIGS. 1-5 and the tub sidewall 454 in FIGS. 10 and 11.

Like before, the mating interface assembly 582 illustrated in FIGS. 12 and 13 includes a tub port adapter 584, a tub port opening 588 in the tub sidewall 554 that is arranged to receive at least part of the tub port adapter 584. As such, it should be appreciated that the tub port adapter 584 is configured to secure the dispenser hose outlet 580 to the tub sidewall 554 of the wash unit tub 530.

Again, the tub port adapter 584 includes a tubular portion 594 that extends annularly about an adapter axis 596 and axially between an inlet end 598 and an outlet end 500. A dispenser hose flange 525 and a dispenser hose shoulder 527 extend circumferentially about the dispenser hose 570 near the dispenser hose outlet 580 at longitudinally spaced locations to define a groove 502 that receives the tubular portion 594 of the tub port adapter 584.

Like in FIGS. 10 and 11, the suspension support bracket 566 shown in FIGS. 12 and 13 includes a dispenser hose cut-out 533 that is configured to receive the dispenser hose flange 525, which abuts the outer sidewall surface 564 of the wash unit tub 530 and is clamped between the outlet end 500 of the tub port adapter 584 and the tub sidewall 554. Like before, the dispenser hose flange 525 include one or more ears 535 that extend radially outwardly from the dispenser hose flange 525 and the dispenser hose cut-out 533 includes one or more notches 537 that are arranged to receive the ears 535 on the dispenser hose flange 525 and prevent rotation (i.e., twisting) of the dispenser hose outlet 580 relative to the suspension support bracket 566.

In accordance with this embodiment, the mating interface assembly 582 further comprises two push-lock projections 516a, 516b on the tub port adapter 584 that are configured to be received in two push-lock receptacles 518a, 518b in the suspension support bracket 566 that are arranged at diametrically opposed locations (i.e., 180 degrees apart) adjacent to the tub port opening 588 in the wash unit tub 530. The push-lock receptacles 518a, 518b may be formed as cut-outs in the two outwardly turned edge walls 531a, 531b of the suspension support bracket 566. The push-lock projections 516a, 516b extend radially outwardly from the tubular portion 594. One of push-lock projections 516a and the corresponding push-lock receptacle 518a are configured to act as a hinge once the push-lock projection 516a is inserted into the push-lock receptacle 518a. The other push-lock projection 516b includes a lip 539 that is configured to snap into the push-lock receptacle 518b when the tub port adapter 584 is pressed down towards the outer sidewall surface 564 of the wash unit tub 530 in a pivoting motion relative to the hinge formed by the push-lock projection 516a and the push-lock receptacle 518a. Thus, the push-lock projections 516a, 516b and the push-lock receptacles 518a, 518b act in concert to form a swing-lock mechanism. The push-lock projection 516b also includes a lever 541. When the lever 541 is pressed radially inward towards the tubular portion 594 of the tub port adapter 584, the push-lock projection 516b bends (i.e., deflects) until the lip 539 is released from the push-lock receptacle 518b, allowing the mating interface assembly 582 to be disassembled. Again, the fasteners 110 used in the design illustrated in FIGS. 1-5 are eliminated in the design shown in FIGS. 12 and 13. It should also be appreciated that push-lock projection 516a could be replaced with a push-lock projection that is constructed like push-lock projection 516b (i.e., the tub port adapter 584 could have two or more push-lock projections that look like element 516b), which would allow the tub port adapter 584 to be mechanically secured to the wash unit tub 530 by simply applying an inwardly directed force to the tub port adapter 584 in a direction parallel to the adapter axis 596 without any pivoting or twisting motion. In the illustrated examples, the laundry appliance 22 is a washer and dryer combination appliance that performs both a wash cycle and a drying cycle, however, it should be appreciated that the wash water dispenser assembly 20 described herein may also be used in laundry appliances that only perform a wash cycle (i.e., in washing machines).

Many modifications and variations of the apparatus and assemblies described in the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A laundry appliance, comprising:
   an appliance housing:
   a wash unit tub disposed inside said appliance housing, said wash unit tub including a tub sidewell;
   a drum rotatbly supported within said wash unit tub for rotation about a drum axis, said drum including a laundry compartment;
   a wash water dispenser hose with a dispenser hose inlet and a dispenser hose outlet;
   a mating interface assembly connecting said dispenser hose outlet to said tub sidewall; and
   said mating interface assembly including a tub port opening that extends through said tub sidewall and a tub port adapter that extends circumferentially about said tub port opening in said tub sidewall and provides a mechanical connection with said dispenser hose outlet,
   wherein said wash unit tub includes at least one suspension support bracket that extends along and runs parallel to said tub sidewall and that is fixed to said tub sidewall, wherein said suspension support bracket includes a dispenser hose cut-out, wherein said dispenser hose includes a dispenser hose flange adjacent to said dispenser hose outlet that is received in said dispenser hose cut-out, and wherein said tub port adapter engages said suspension support bracket that said dispenser hose flange is clamped between said tub port adapter and said tub sidewall.

2. The laundry appliance as set forth in claim 1, wherein said mating interface assembly includes one or more twist-lock projections on said tub port adapter that are configured to engage one or more twist-lock receptacles provided on said suspension support bracket as said tub port adapter is rotated about an adapter axis.

3. The laundry appliance as set forth in claim 1, wherein said mating interface assembly includes one or more push-lock projections on said tub port adapter that are configured to engage one or more push-lock receptacles provided on said suspension support bracket.

4. The laundry appliance as set forth in claim 1, wherein said tub port adapter includes a tubular portion that terminates at an adapter flange and wherein said dispenser hose outlet includes a groove that receives said adapter flange such that said mechanical connection between said tub port adapter and said dispenser hose outlet is a tongue-and-groove connection.

5. The laundry appliance as set forth in claim 1, wherein said tub sidewall is made of metal, said dispenser hose is made of a non-metal, and said tub port adapter is made of a polymer and eliminates a metal to non-metal mating interface between said tub sidewall and said dispenser hose.

6. The laundry appliance as set forth in claim 1, wherein said tub port adapter is integrally formed with said tub sidewall.

7. The laundry appliance as set forth in claim 1, wherein said dispenser hose flange extends radially outwardly from said dispenser hose adjacent to said dispenser hose outlet and wherein said tub port adapter has a tubular portion that is arranged such that said dispenser hose flange is clamped between said tubular portion of said tub port adapter and said tub sidewall.

8. The laundry appliance as set forth in claim 7, wherein said dispenser hose includes a dispenser hose shoulder that extends circumferentially about the dispenser hose at a location that is longitudinally spaced from said dispenser hose flange to define a groove in said dispenser hose that receives said tubular portion of said tub port adapter.

9. The laundry appliance as set forth in claim 1, wherein said dispenser hose cut-out in said suspension support bracket is concentrically arranged about said tub port opening in said tub sidewall and is larger in diameter than said tub port opening such that said dispenser hose flange abuts an outer sidewall surface of said tub sidewall and extends circumferentially about said tub port opening to prevent leaks.

10. The laundry appliance as set forth in claim 1, wherein said dispenser hose flange includes one or more ears that extend radially outwardly from said dispenser hose flange and said dispenser hose cut-out in said suspension support bracket includes one or more notches that are arranged to receive said one or more ears on said dispenser hose flange to prevent rotation of said dispenser hose outlet relative to said suspension support bracket.

11. The laundry appliance as set forth in claim 2, wherein each twist-lock receptacle is formed of a tab that is cut out of and bent away from said suspension support bracket and wherein each twist-lock projection extends radially outwardly from said tub port adapter and has a ramp-like shape with an inclined surface that faces towards and contacts said tab as said tub port adapter rotates causing said inclined surface to urge said tub port adapter toward the tub sidewall and press said dispenser hose flange against an outer sidewall surface of said tub sidewall.

12. The laundry appliance as set forth in claim 11, wherein each twist-lock projection includes a stop that is arranged to contact said tab to prevent over-rotation of said tub port adapter.

13. The laundry appliance as set forth in claim 1, wherein said mating interface assembly includes two push-lock projections that are arranged at diametrically opposed locations on said tub port adapter and that are configured to engage two push-lock receptacles provided on said suspension support bracket.

14. The laundry appliance as set forth in claim 13, wherein said suspension support bracket includes two outwardly turned edge walls and said push-lock receptacles are cut-outs in said two outwardly turned edge walls of said suspension support bracket and wherein said push-lock projections extend radially outwardly from said tub port adapter.

15. The laundry appliance as set forth in claim 14, wherein said two push-lock projections include a first push-lock projection and a second push-lock projection and wherein said two push-lock receptacles include a first push-lock receptacle and a second push-lock receptacle.

16. The laundry appliance as set forth in claim 15, wherein said first push-lock projection and said first push-lock receptacle are configured to act as a hinge when said first push-lock projection is inserted into said second push-lock receptacle and wherein said second push-lock projection includes a lip that is configured to snap into said second push-lock receptacle such that said first and second push-lock projections and said first and second push-lock receptacles act in concert to form a swing-lock mechanism where said tub port adapter moves in a pivoting motion relative to said hinge as said tub port adapter is pressed towards said tub sidewall.

17. The laundry appliance as set forth in claim 16, wherein said second push-lock projection includes a lever that causes said second push-lock projection to bend until said lip is released from said second push-lock receptacle, allowing said mating interface assembly to be disassembled.

\* \* \* \* \*